Jan. 17, 1956 W. V. KENNEDY 2,731,108
PLEATED PAPER FILTER ELEMENT
Filed July 6, 1953
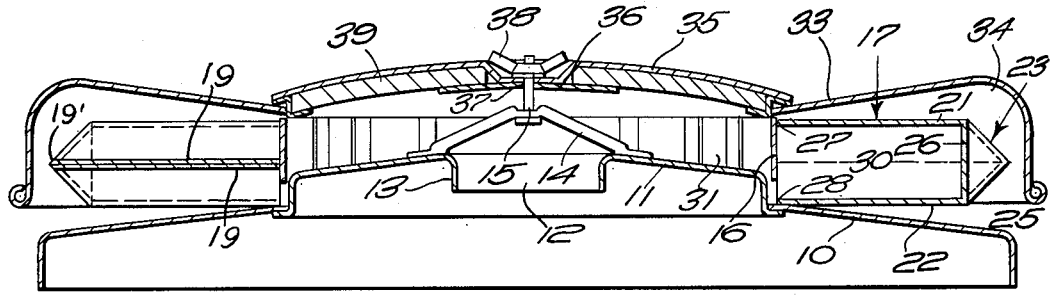
FIG. 1
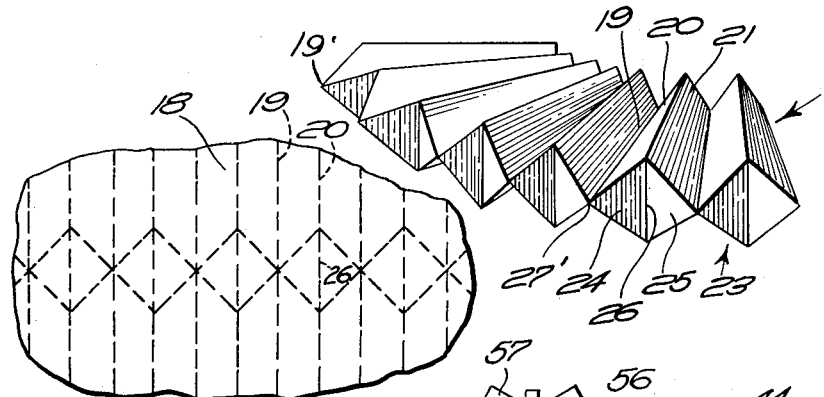
FIG. 2
FIG. 3
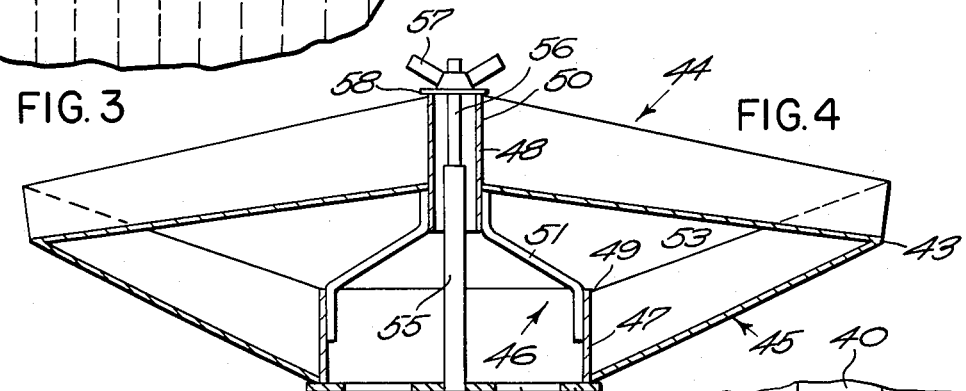
FIG. 4
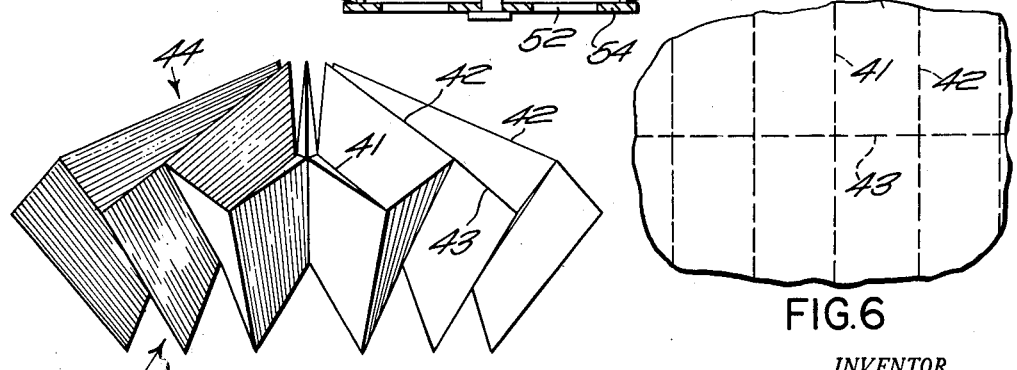
FIG. 5
FIG. 6
*INVENTOR.*
WALTER V. KENNEDY
BY
*Barlow & Barlow*
ATTORNEYS

United States Patent Office 2,731,108
Patented Jan. 17, 1956

2,731,108

PLEATED PAPER FILTER ELEMENT

Walter V. Kennedy, Central Falls, R. I., assignor to Fram Corporation, a corporation of Rhode Island Application July 6, 1953, Serial No. 366,362

2 Claims. (Cl. 183—71)

This invention relates to a filter and more particularly to the medium through which a fluid is to be passed to remove from it contaminant which it is desired should be eliminated from the fluid.

The invention is directed primarily to an air filter, but the principle involved may apply to filtration of any fluid and for any use.

One of the objects of the invention is to provide a filtering element which may be of relatively low vertical dimension but of any size laterally depending upon the amount of surface area to be exposed and thus is of a generally pancake type of construction and is particularly useful in connection with the filtering of air used in connection with an internal combustion engine.

Another object of the invention is to provide a filter which is of such construction that it may be used with a silencer or resonator for the intake air of an engine and yet will fit into a location where there is vertical space limitation.

Another object of the invention is to provide a construction of filter element having a large exposed area of a paper for passage of air therethrough.

Another object of the invention is to provide a construction of pleated paper filter element which will have a minimum number of parts and minimum number of manufacturing operations.

Another object of the invention is to provide a filter element which may be easily removed and replaced in such construction as is used for the filtering of air in connection with the carburetor of an internal combustion engine.

Another object of the invention is to so fold the filter element that it is stiffened radially by reason of its folded structure making unnecessary an outer peripheral support.

With these and other objects in view, the invention consists of certain novel features of construction as will be more fully described and particularly pointed out in the appended claims.

In the accompanying drawings:

Fig. 1 is a sectional view through the upper portion of a carburetor air filter showing my filter element in position therein.

Fig. 2 is a perspective view to better illustrate the pleated form of the filter element.

Fig. 3 is a fragmental top plan view of a sheet of paper which shows in broken lines the creases or folds which occur in the paper and along which it is folded to provide the form shown in Fig. 2.

Fig. 4 is a sectional elevation of a modified form of filter element shown as assembled with a removable cap which may be positioned in the air filter and also showing the stem of the air filter on which it is mounted.

Fig. 5 is a perspective view of the structure illustrated in Fig. 4 to better show the folding of the paper to provide this structure.

Fig. 6 is a fragmental plan view of a portion of a sheet of filter paper showing in dash lines the fold lines along which the folds which are shown in Fig. 5 are made in order to provide the form there shown.

In proceeding with this invention and for illustrative purposes of a typical example, I mount upon the air flow conduit to the carburetor about which a silencer is located an annular type of pleated paper suitably supported on a lift member and which may be taken from the filter and replaced by a fresh structure as occasion may require, the element being of a structure which has upper and lower walls connected by an end wall all folded from a single sheet and which thus provides substantially duplicate filter areas to increase the area through which the filtrate may pass in a given radial space. The element by being folded upon itself also provides a stiffening of the structure and makes unnecessary a support at its outer periphery.

With reference to the drawings, 10 designates the upper wall of a resonating chamber having a cap portion 11 with an opening 12 centrally thereof formed by a flange 13. A spider 14 bridges this opening and has a mounting stud 15 extending upwardly therefrom. A rigid band 16 encircles the cap portion 11 and is a part of the filter element which also comprises the pleated paper 17, shown in section in Fig. 1 and in perspective in Fig. 2.

This pleated element is formed from a flat sheet of paper, a portion of which is shown in Fig. 3 and designated 18, and is creased in parallel lines as at 19 and 20 that it may be folded to form a pleated top wall 21, having the oppositely sloping panels best shown in Fig. 2, and also form the similarly pleated bottom wall 22 having inclined panels. These two walls 21 and 22 contact one another along the fold lines 19 as shown in section at the left-hand side of Fig. 1. As a result of this construction, the pleated upper wall 21 and pleated bottom wall 22 together form a series of connected four-sided hollow tubes as best shown in Fig. 2. These walls are joined by an end wall 23 which is formed by outwardly extending triangular sections 24 and 25 which emanate from a fold line 26 joining the two fold lines 20 in the opposite top and bottom walls. These sections also come to a point at 19', which point is on the line 19 of the pleated structure. The free edges 27 and 28 of the top and bottom walls are secured to the rigid band 16 by some suitable adhesive, one example of which is known in the trade by the trade name "Chem-o-Sol." The formation of the paper element in this manner provides a supporting rigid structure which may be of any radial dimension but of a limited vertical dimension. There is a space provided between the walls as at 30 so that air that passes inwardly through the walls 21, 22, or 23 may move radially inwardly through the spaces 31 of the rigid band 16 and then pass on through the opening 12 to the carburetor.

A protecting shell 33 of the cross sectional shape best shown in Fig. 1 rests on the top of the band 16 and comprises an element housing area 34 to extend over the pleated paper and a cover portion 35 which is dapped inwardly as at 36 and provided with an opening 37 which fits on to the stud 15 and is held thereon by the wing nut 38 having threaded engagement with the stud. A felt pad or some soft material which may be effective as a silencer is shown at 39 beneath this cover 35. This shell may be easily removed by removing the wing nut, whereupon the filter element comprising the rigid band 16 and the paper filter element 17 may be taken out and replaced.

In some cases instead of utilizing the structure shown in Figs. 1, 2, and 3, I may provide a filter element as shown in Fig. 4. This filter element also comprises a flat sheet of paper, one portion of which is designated 40, with score lines 41 and 42 connected by a cross score line 43. These score lines are for folding the filter element along the line 43 (see Figs. 4 and 5) and then folding the paper along the score lines 41 and 42 at either side of this fold 43 so as to provide a pleated formation for both upper wall 44 and lower wall 45, as seen in Fig. 4. These two walls may be spread apart about the line 43 as an edge to the desired extent and the free edges of the walls secured to some rigid member which I have shown at 46 in Fig. 4 and which comprises a lower band 47 and an upper band 48, the edges 49 of the wall 45 being secured to the band 47 and the edges 50 of the wall 44 being secured to the band 48. These bands are connected together by a spider formation 51 which permits the interior area 53 of the formation to connect directly with an opening 52 in the portion 54 of the filter casing for transmitting air thereto. The stud 55 in this case is of a greater extent and ends with a smaller portion 56 which extends through the cylindrical member 48 and has a wing nut 57 mounted thereon for engaging a washer 58 to hold the rigid frame 46 in assembled position in the filter casing. The upper wall 44 in this case is somewhat longer than the lower wall 45 in order that the structure may be adapted to fit into the space available.

It will be seen from the foregoing that in each embodiment of the invention shown a continuous sheet of porous paper is provided with spaced parallel score lines extending in one direction of the paper. In the embodiment shown in Figs. 1, 2 and 3 the sheet of paper is provided with oppositely inclined pairs of fold lines extending from one parallel line to another, and they form a row extending at right angles to the parallel lines. The sheet is folded at the location of said row along said inclined lines to form an upper pleated panel and a lower pleated panel. In the embodiment shown in Figs. 4, 5 and 6 a sheet of paper having the parallel lines above mentioned is provided near a middle portion thereof with a fold line that crosses the parallel lines at right angles thereto, and this sheet is folded along such fold line to form an upper panel and lower panel. The panels are pleated so that the fold lines assume the zigzag appearance shown in Fig. 5.

In all cases the paper may be of such structure as to readily pass air therethrough and may be treated so as to resist ignition from flame such as by the use of tricresyl phosphate or one of the borics or ammonium salts and also may be treated so that its surface may be rather hard so that dust may be shaken therefrom should the same collect on the surface. This same treatment may also serve to prevent the accumulation of moisture in the paper.

I claim:

1. A hollow filter element comprising a continuous sheet of porous paper provided with parallel score lines extending in one direction and provided with oppositely inclined pairs of fold lines extending between the parallel lines to form a row extending at right angles to the parallel lines, said sheet being folded at the location of said row along said inclined lines and along said score lines to provide an upper pleated wall having inclined panels and a lower pleated wall having inclined panels, and the fold lines of the upper and lower walls contacting along the alternate folds, whereby together they form a series of four-sided tubes connected one to the other, the ends of said folded sheet being secured together to form an annulus about a central hole, said sheet being folded only along the parallel lines and inclined lines above mentioned to form the filter element.

2. A filter element as in claim 1 wherein the outer ends of said tubes are closed by integral, protruding, triangular sections.

References Cited in the file of this patent

UNITED STATES PATENTS 2,683,537     Dobrolet _____ July 13, 1954

FOREIGN PATENTS 998,981     France _____ Sept. 26, 1951